(12) United States Patent
Pilby

(10) Patent No.: US 8,579,447 B2
(45) Date of Patent: Nov. 12, 2013

(54) LIGHT CONTROL GRID FOR CLOSE WORK

(75) Inventor: Stephen Pilby, Edmonton (CA)

(73) Assignee: Stephen Pilby (CA)

( * ) Notice: Subject to any disclaimer, the term of this patent is extended or adjusted under 35 U.S.C. 154(b) by 694 days.

(21) Appl. No.: 12/791,285

(22) Filed: Jun. 1, 2010

(65) Prior Publication Data

US 2011/0292634 A1 Dec. 1, 2011

(51) Int. Cl.
*G03B 15/02* (2006.01)

(52) U.S. Cl.
USPC ............................. 362/16; 362/292; 362/320

(58) Field of Classification Search
None
See application file for complete search history.

(56) References Cited

U.S. PATENT DOCUMENTS

| | | | |
|---|---|---|---|
| 2,398,799 A | 4/1946 | Miller | |
| 4,841,947 A * | 6/1989 | Johnson | 362/291 |
| 5,556,186 A | 9/1996 | Pilby | |
| 6,010,234 A * | 1/2000 | Rahn | 362/320 |
| 7,198,388 B2 * | 4/2007 | Pilby | 362/354 |
| 8,014,654 B2 * | 9/2011 | Karle | 362/18 |
| 2006/0007666 A1 | 1/2006 | Cook | |
| 2006/0126336 A1 | 6/2006 | Solomon | |

FOREIGN PATENT DOCUMENTS

DE 10 2008 007007 8/2009

OTHER PUBLICATIONS

European Patent Office's Search Report Jul. 21, 2011.
Reply to search opinion/written opinion/IPER, Jun. 18, 2012.
Corrected claims to reply to search opinion/written opinion/IPER, Jul. 2, 2012.

* cited by examiner

*Primary Examiner* — Y My Quach Lee
(74) *Attorney, Agent, or Firm* — Robert J. Lauson, Esq.; Lauson & Tarver LLP

(57) ABSTRACT

When placing a photographic subject close to a large light source equipped with a light control grid, the problem of occluded light channels is solved by variably converging the channels, such that the soft light is directed at a focal point that can be as close as one-half the diagonal dimension of the light source. The light channels are formed by generally planar intersection of strips, the strips preferably made of a flexible fabric material and having slots with corresponding slots on other strips. Optionally, a deployable frame may be provided to help support the grid.

12 Claims, 4 Drawing Sheets

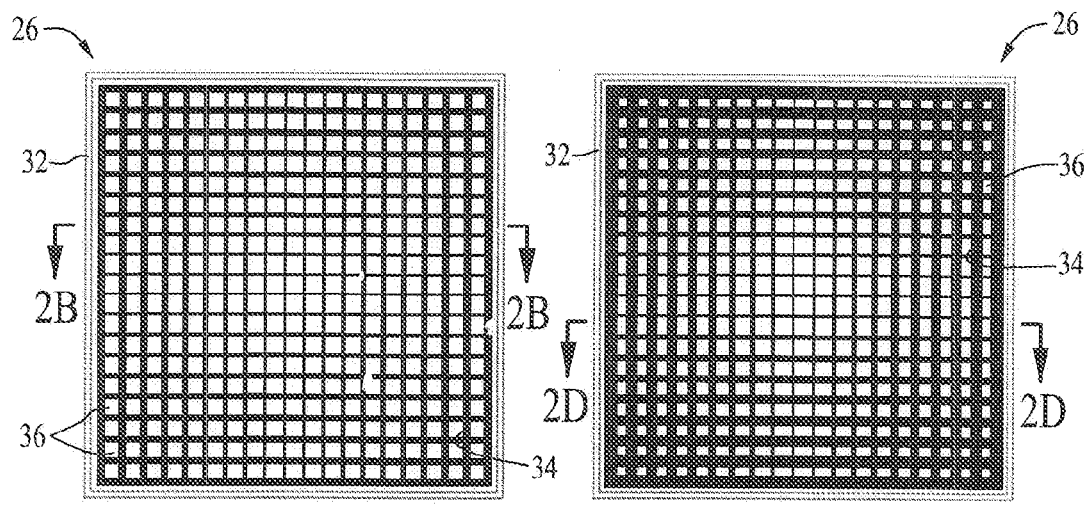
FIG. 2A PRIOR ART
FIG. 2C PRIOR ART
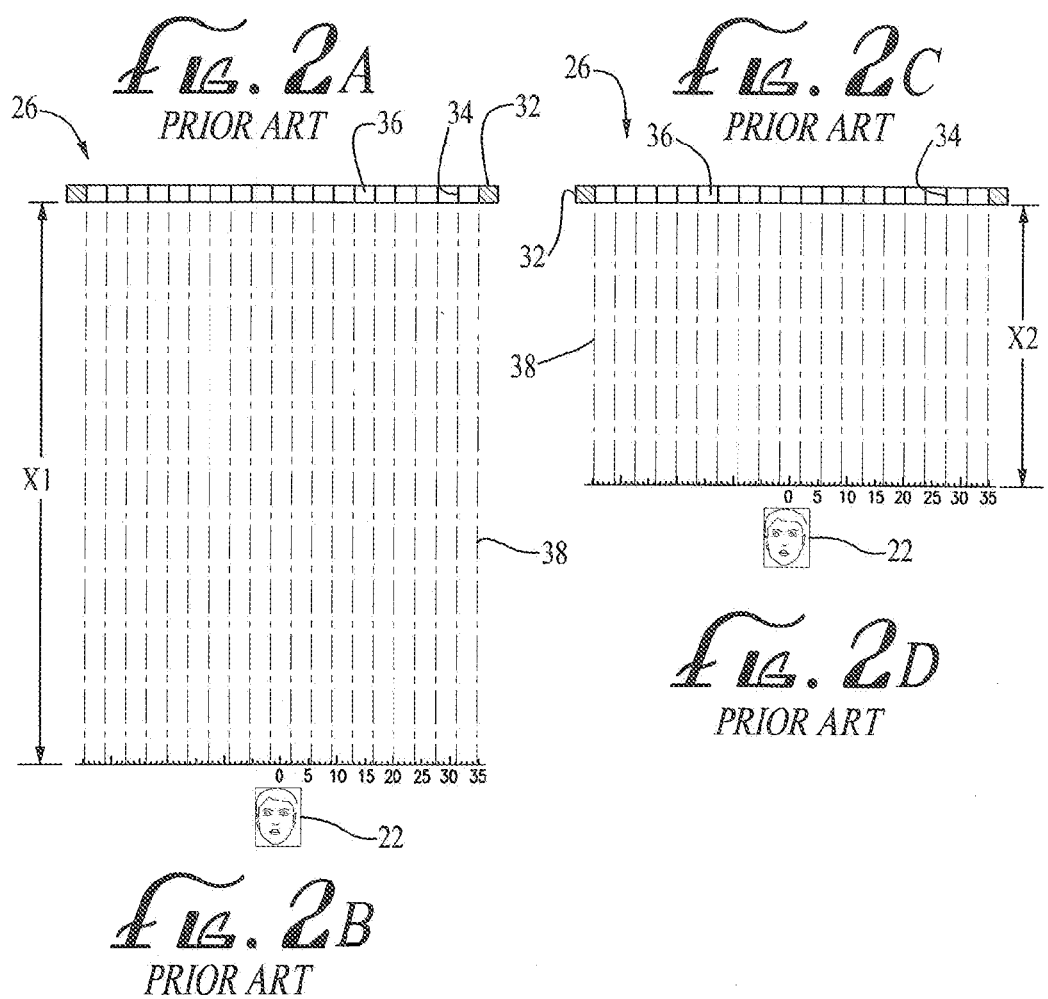
FIG. 2B PRIOR ART
FIG. 2D PRIOR ART

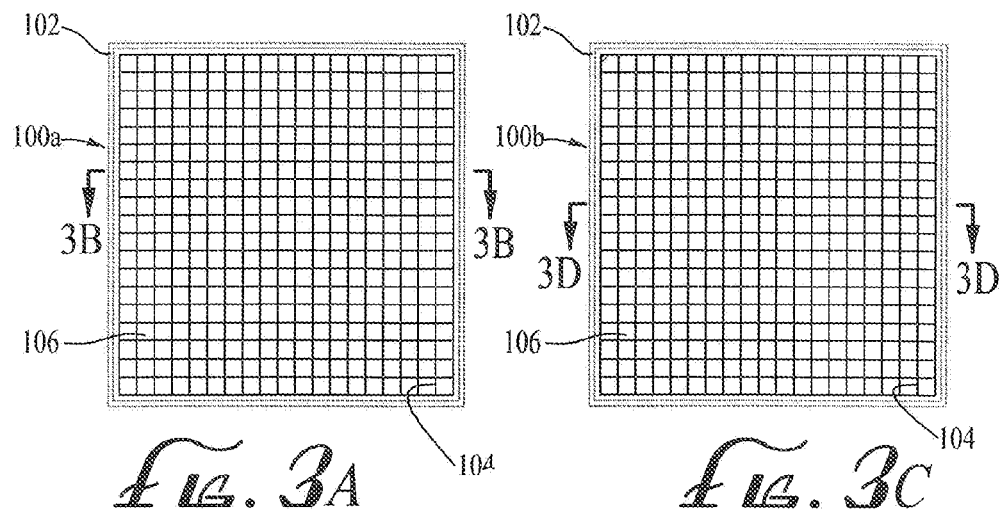
*Fig. 3A*  *Fig. 3C*
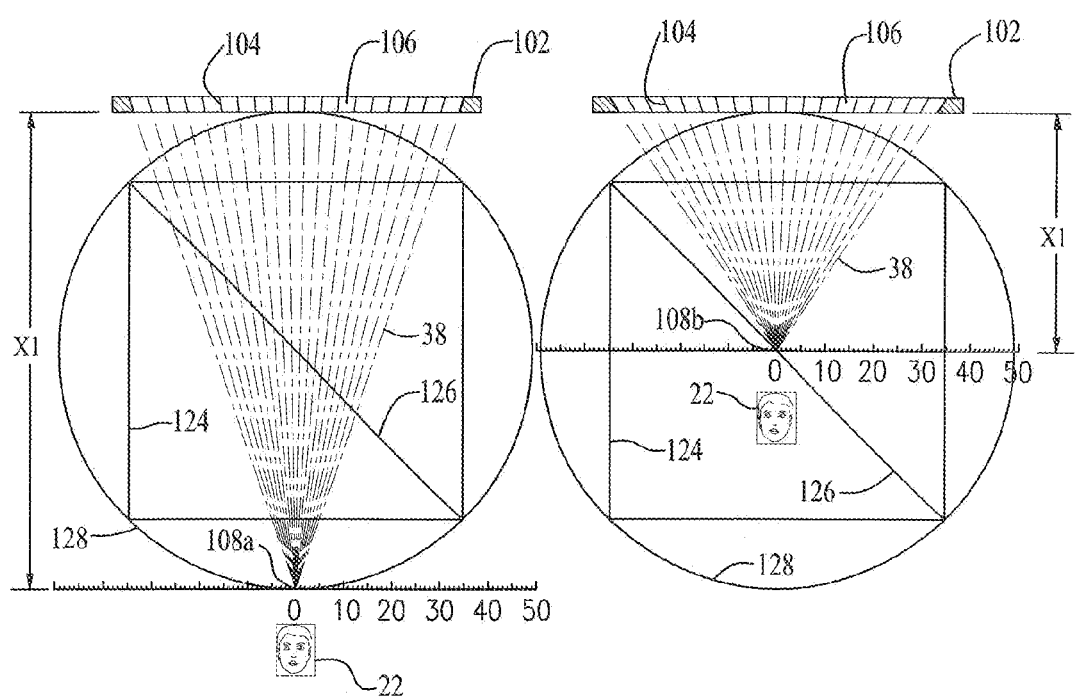
*Fig. 3B*  *Fig. 3D*

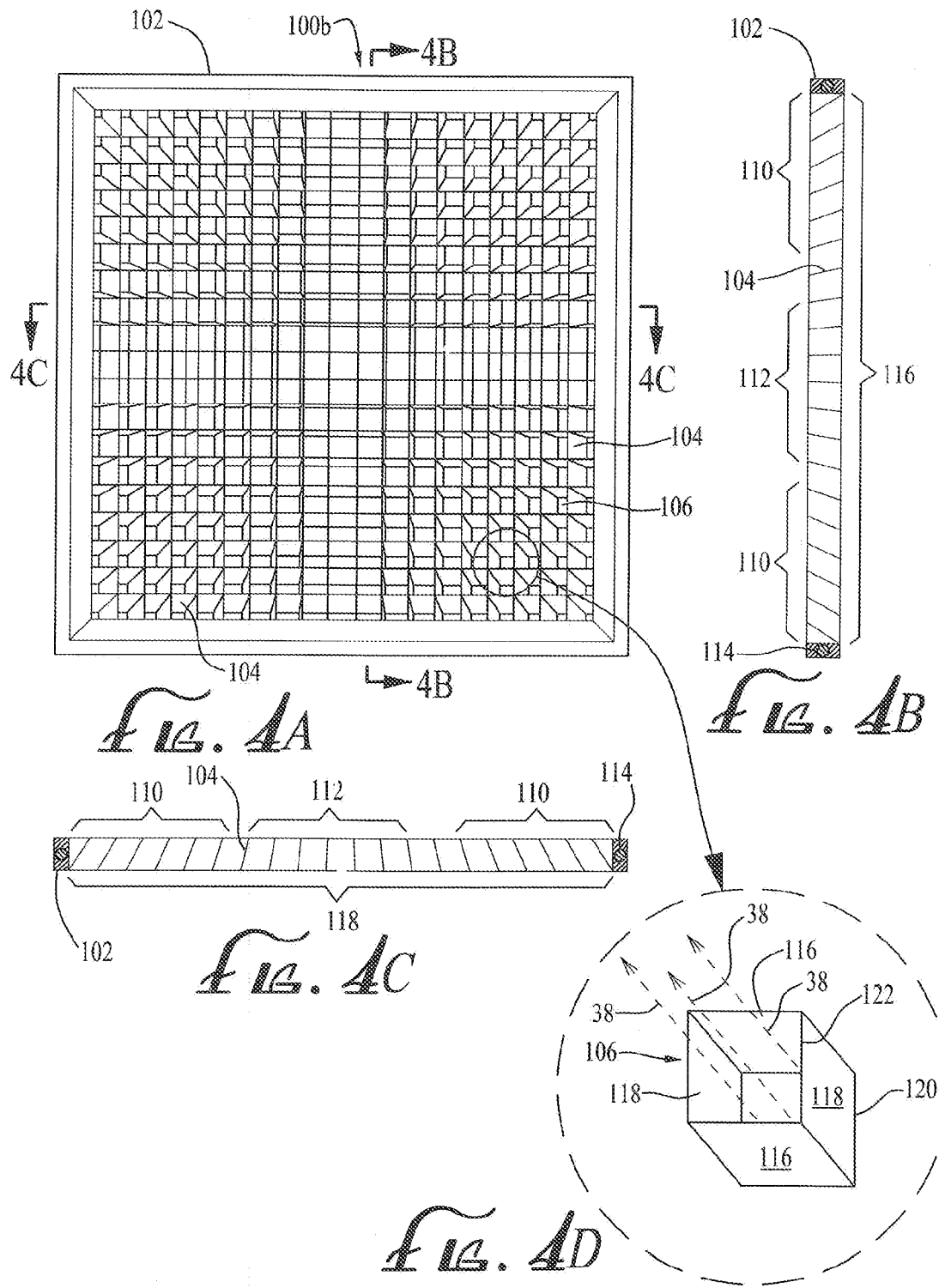

US 8,579,447 B2

LIGHT CONTROL GRID FOR CLOSE WORK

BACKGROUND

Pilby's U.S. Pat. No. 5,556,186 issued in 1994 was a pioneer invention that changed the way diffused light is controlled by photographers and cinematographers. Prior to Pilby's invention, diffused light for photographer's soft boxes or other soft light sources was controlled by bulky "barn doors" attached around the soft sources, or "flags," typically large black cloths in a wire frame mounted on stands or hung overhead near light sources. Light control grids that existed were rigid, heavy, bulky and expensive. Pilby's Lightools® Soft Egg Crates® Light Control Grids changed all that. The grids are a flexible fabric material and thus collapsible, but of a construction with intersecting and interlocking strips keeping the grid taut, and easy to manufacture. The invention met with critical acclaim and much commercial success the past 15 years. Over that time period the '186 patent claims were also successfully enforced a number of times, indicating the industry's acceptance and respect for the patent.

A standard photographic setup using the light control grid as per the '186 patent is shown in FIG. 1. Photographers often desire a soft light condition that is best achieved by: (1) using a dimensionally large light source to create soft light and (2) placing the photographic subject relatively close to the light source. The large light source 20 is a diffused light source with a square aperture forming a reflective enclosure around the lamp. The optimal position of the subject 22 to obtain a maximum soft light benefit is a distance approximately no greater than the diagonal dimension of the light source aperture (D), but this close subject position has a drawback. With Pilby's light control grids 26 of the '186 patent applied to the aperture 30, small subjects closer than about three (3) times the diagonal dimension receive less of the full large soft light capability, because much of the light headed for the subject 22 is blocked by neighboring cells of the grid. Even though the '186 light control grid 26 quite effectively prevents light spillage overall, at close proximity light is not optimally controlled, an undesirable effect that photographer's have now had a long interest in mitigating.

How light can be blocked at close range is seen from the point of view of the photographic subject 22, as shown in FIGS. 2A-D. The '186 light control grid 26 has a large rectangular frame 32 with intersecting and interlocking fabric strips 34 that form a large number of light channels 36, which are each several inches long (the width of the strips 34) and pointed straight out from the light source 20 and oriented parallel to one another. When viewed by the subject 22 from a distance that is closer than about three times the diagonal dimension of the grid 26, the light coming through the outermost light channels 36 is occluded from subject's view by the walls of the light channels 36.

The magnitude of the occlusive effect can be seen when comparing FIG. 2A to FIG. 2C, where the prior art light control grid 26 is again shown in one-point perspective from the viewpoint of the subject 22 located front-center of the light source 20. In FIG. 2A, the subject 22 is a distance X1 from the light control grid 26, where X1=1D (one times the diagonal dimension of the light source). The light channels 36 located near the center of the grid 26 are not occluded since the subject 22 is directly in front of these light channels 36. The light channels 36 located near the outermost portion of the grid 26, approaching the frame 32 and especially at the corners, are partially occluded from view by the fabric strips 34 that form the walls of the light channels 36. FIG. 2B shows section 2B-2B of FIG. 2A, where the parallel relationship of the prior art fabric strips 34 can be clearly seen, which form the light channels 36 that direct the light 38 straight forward, some portion of the light 22 not being directed at the subject.

This occlusive effect is further accentuated in FIG. 2C where the subject 22 is moved an even shorter distance X2, where X2=0.5D (one-half diagonal dimension). The light channels 36 near the central area are again not occluded. The light channels 36 near the outer regions of the grid 26, however, are substantially occluded by the fabric strips 34 of the light channel 36 walls, disadvantageously blocking a good portion of the light 38 from reaching the subject 22. For the popular prior art Soft Egg Crates® Grids currently being sold, only these centermost light channels cast light directly on the subject 22. At close distances this may mean that as little as 10% of the available light is directly cast on the subject, creating less than ideal lighting conditions. This significant issue has been unresolved in the photography/cinematography circles since the '186 patent issued and the commercial embodiment went on sale about 15 years ago.

Accordingly, there exists a continued need for a significantly improved light control grid for photography close to large light source, that overcomes the limitations of Pilby's earlier invention and the other prior art, and is again embodied in a simple and inexpensive device, that is easy to use and conveniently stored when not in use.

SUMMARY

The present invention resolves many of the above-mentioned problems in the prior art and permits the effective use of soft light through combining of a large light source and locating the photographic subject close to the large light source. The present invention eliminates the occlusive effect seen in prior art light grids and permits the precise focusing of the light on a controlled area at a focal point, without loss of large source illumination due to light channel or cell occlusion.

These benefits are achieved by a light control grid for attachment to a large light source for providing controlled soft light to a focal point close to the light source. The light control grid has many light channels formed by the planar intersection of a number of strips. Selected light channels near the outer boundary of the grid are angled substantially convergently. While other selected light channels that are more centrally located on the grid are substantially straight. And those light channels located between the outer boundary and the central area converge to a lesser extent than those at the outer boundary. The light channels work cooperatively such that light passing from the large source through the grid is directed to the focal point about x times the diagonal width of the light source away from the light source. The variable "x" defines the distance of the subject from the light source relative to the size of the light source. A higher degree of convergence will bring the focal point closer to the grid (where x may be equal to about ½), while a lower degree of convergence will send the focal point further from the grid (where x may be equal to about 1).

Preferably the grid is a flexible fabric material and thus collapsible and generally planar having a depth of about 2-3 inches. Preferably the strips are two sets, one generally horizontal and the other generally vertical, and the strips each have a number of slots which correspond with slots on other strips, and their cross engagement forms the grid. Optionally, a deployable frame or other support members may be attached to the otherwise collapsible grid to give it rigidity.

BRIEF DESCRIPTION OF THE DRAWINGS

FIG. 2A is one-point perspective front view of the prior art light control grid, the perspective point being located a distance equal to one diagonal distance from the front;

FIG. 2B is a sectional view of FIG. 2A, illustrating the distance of the prior art light control grid from the photographic subject;

FIG. 2C is one-point perspective front view of the prior art light control grid, the perspective point being located a distance equal to one-half diagonal distance from the front;

FIG. 2D is a sectional view of FIG. 2C, illustrating the distance of the prior art light control grid from the photographic subject;

FIG. 3A is one-point perspective front view of a first model new light control grid for close up applications, the perspective point being located a distance equal to one diagonal distance from the front of the light source;

FIG. 3B is a sectional view of FIG. 3A, illustrating the distance of the new light control grid for close up applications from the photographic subject and showing the focusing of the light on a focal point one diagonal distance from the light source;

FIG. 3C is one-point perspective front view of a second model new light control grid for close up applications, the perspective point being located a distance equal to one-half diagonal distance from the front of the light source;

FIG. 3D is a sectional view of FIG. 3C, illustrating the distance of the new light control grid for close up applications from the photographic subject and showing the focusing of the light on a focal point one-half diagonal distance from the light source;

FIG. 4A is a front plan view of the new light control grid for close up applications;

FIG. 4B is a sectional view of FIG. 4A, the section taken along a vertical axis;

FIG. 4C is a sectional view of FIG. 4A, the section taken along a horizontal axis; and FIG. 4D is an enlarged front plan view of one isolated converging light channel, illustrating the focusing of the light passing therethrough.

Figure 1:
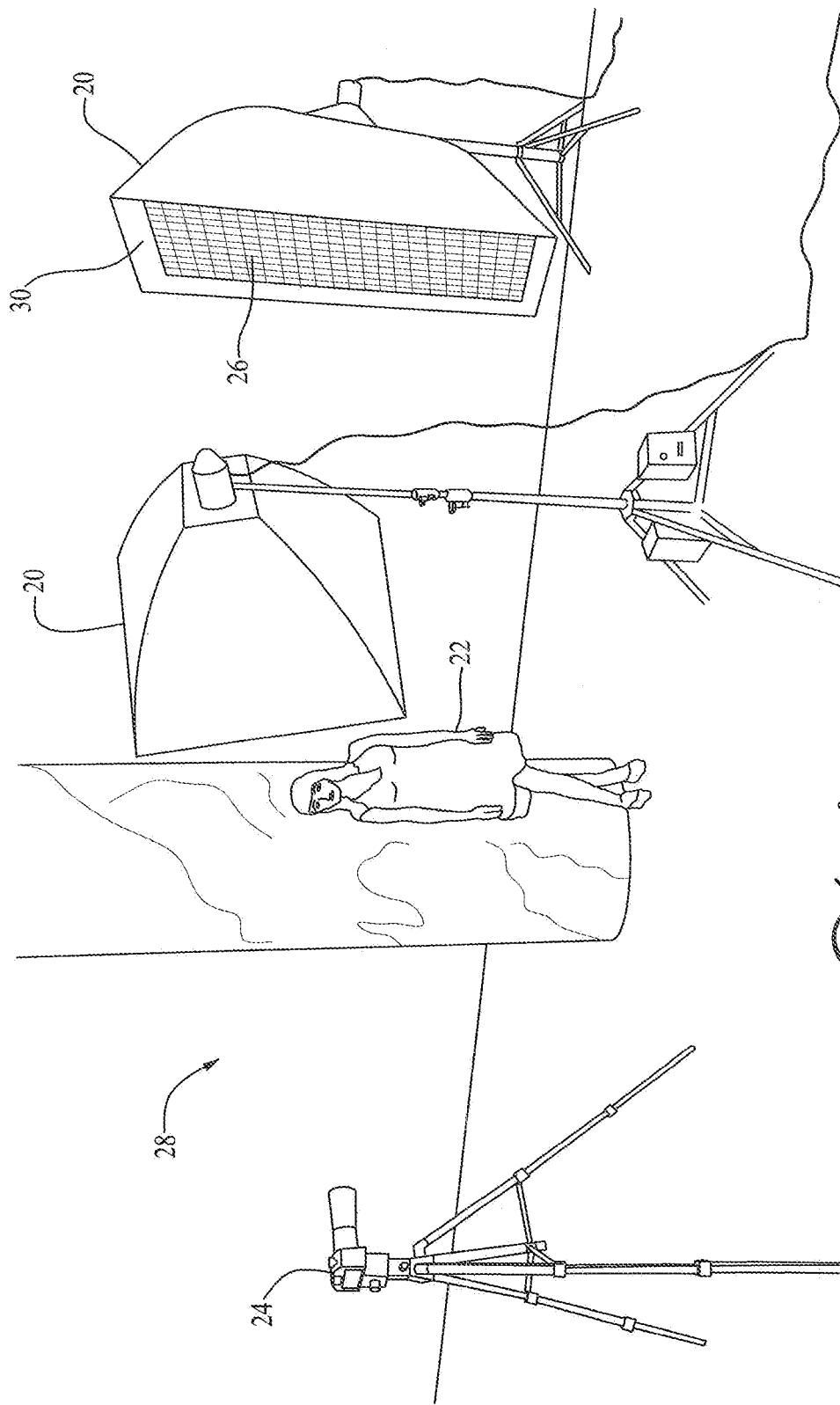
FIG. 1 is a perspective view of a typical photography studio setup using the light control grids of the prior art.

| LISTINGS OF REFERENCE NUMERALS | |
|---|---|
| large light source (soft box) | 20 |
| photographic subject | 22 |
| camera | 24 |
| standard light control grid | 26 |
| surrounding area of the set | 28 |
| aperture | 30 |
| frame | 32 |
| interlocking fabric strips | 34 |
| light channels | 36 |
| light | 38 |
| collapsible light control grid | 100a |
| collapsible light control grid | 100b |
| collapsible frame | 102 |
| interlocking fabric strips | 104 |
| focused light channels | 106 |
| focal point | 108a, 108b |
| outer boundary light channels | 110 |
| central area light channels | 112 |
| collapsible frame | 114 |
| first series of aligned strips | 116 |
| second series of aligned strips | 118 |
| light inlet | 120 |
| light outlet | 122 |
| grid outline | 124 |
| diagonal | 126 |
| diameter | 128 |

DETAILED DESCRIPTION

Referring first to FIGS. 3A-D a preferred embodiment of the present invention is shown. In FIGS. 3A-B, the subject 22 is a distance X1 from the vertically oriented collapsible light control grid 100a, where X1=1D (one diagonal dimension), which is 98.2 inches in this exemplary embodiment (the diagonal distance of a 6 ft.×6 ft diffused light and control grid used in this example). The light 38 is shown converging at a focal point 108 that is 98.2 inches from the grid 100a. This is due to the angling of the interlocking fabric strips 104 in such a manner to create this desired focal point 108. If the subject 22 were to be moved closer to the grid 100a it can be appreciated that the focal point 108a would be located behind the subject 22, and the subject 22 would be exposed to a larger focal area of the light 38, thus the illumination would be spread over a larger area. For illustrative purposes in FIG. 3B, the grid outline 124 is shown overlaid on the focused light 38 pattern, showing the diagonal 126 dimension of the grid 100a and the resulting diameter 128. It can be seen that the subject 22 and the focal point 108a are both one diameter away from the grid 100a.

Comparing prior art FIG. 2A with the present invention's FIG. 3A, both are shown in one-point perspective, from the view point of the subject 22. In contrast with FIG. 2A, FIG. 3A demonstrates that there is no occlusion from the subject's 22 view point. So, as a result, at the focal point 108a, only the edges of the flexible fabric strips 104 can be seen by the subject 22, due to the convergently angled focused light channels 106, designed to converge at a point directly in front of the grid 100a at a distance of 98.2". So, instead of being cast around the subject 22, the light 38 is focused with precision on the subject 22, without unnecessary light spillage.

The collapsible light control grid 100b shown in FIG. 3C is similar to that shown in FIG. 3A, except the focal point 108b is a distance equal to one-half diameter 128, such that the focal point 108b is a distance of 49.1" from the grid 100b. This shorter focal point 108b (as compared with the 98.2" focal point 108a) is due to the increased angling of the flexible fabric strips 104 of the grid 100b. These two exemplary focal points, 100a and 100b, are just two of the many possible focal points that may be designed by the calculated angling of the flexible fabric strips 104 of the present invention.

Turning now to FIGS. 4A-D, a more detailed illustration of the collapsible light control grid 100b with a 49.1" focal point is shown. Looking particularly at FIG. 4A, the front plane view of the invention can be seen, showing the focused light channels 106 angled convergently towards the focal point 108b that is centered directly in front of the grid 100b. The light channels 106 located near the outer boundary area 110, near the perimeter of the grid 100b, are set at a larger angle (angled towards the focal point 108b) than the light channels 106 that are located near the central area 112. These central area 112 light channels 106 have little to no angle; thus they direct the light 38 substantially straight ahead.

Looking at section 4B-4B shown in FIG. 4B, a first series of aligned strips 116 is shown, where each interlocking fabric strip 104 angled complementarily to the rest in the series 116 to converge at the focal point 108b. Likewise, in section 4C-4C shown in FIG. 4C, the second series of aligned strips 118 is shown, where each interlocking fabric strip 104 angled complementarily to the rest in the series 118 to converge at the focal point 108b. The first series 116 works cooperatively with the second series 118, to fully focus the light 38 at the focal point 108b. A collapsible frame 114 is provided to permit the grid 100b to collapse and fold down to a portable configuration. The collapsible frame 114 is preferably constructed of lightweight aluminum rods made of multiple sections connected through shock cords and designed to connect to form a rigid frame 102 that can connect to the aperture 30 of a large light source 20, through use of hook and loop fasteners or the like.

The focusing of the light 38 towards the focal point 108*b*, can be best seen in FIG. 4D, where one of the light channels 106 found near the outer boundary 110 has been isolated and enlarged to illustrate its inventive light-focusing function. The light channel 10.6 is created through the planar intersection of the first series 116 and the second series 118 of interlocking fabric strips 104 that together form a perimeter wall. The open-ended light channel 106 has a light inlet 120 which permits the entry of light into the light channel 106 and a light outlet 122 which permits the exit of the light from the light channel 106. In operation, the light 38 is produced by the large light source 20, where the light has been diffused from the light source 20 and directed straight forward in a parallel manner over a large area. The collapsible light control grid 100*b* is placed on the aperture 30 of the large light source 20; and the light 38 enters the light inlet 120 from the large light source 20, is directed by the focused light channel 106 convergently towards the focal point 108*b*, and exits the focused light channel 106 via the light outlet 122, aimed directly at the focal point 108*b*.

While the present invention has been described with regards to a particular embodiment, it is recognized that additional variations of the present invention may be devised by persons skilled in the art without departing from the inventive concepts disclosed herein.

What is claimed is:

1. A collapsible light control grid for attachment to a large generally square-shaped source of light with a lamp fixed inside an enclosure, for providing controlled soft light to a focal point proximate the source of the light, said light control grid comprising:
a grid formed by planar intersection of a plurality of flexible fabric strips defining a multiplicity of light channels about a central area and inside an outer boundary of the grid;
selected light channels proximate the outer boundary being angled substantially convergently towards the focal point;
other selected light channels less proximate the outer boundary being similarly angled convergently to a lesser extent than the selected light channels proximate the outer boundry;
and still other selected light channels proximate the central area being substantially straight towards the focal point.

2. The collapsible light control grid of claim 1 further comprising a deployable frame attachable to the collapsible light control grid.

3. The collapsible light control grid of claim 1 wherein each of the strips have a plurality of slots which engage the slots of the other strips to form the grid.

4. The collapsible light control grid of claim 1 wherein the grid has a depth of about 2-3 inches.

5. A light control grid attachable to a conventional soft box for providing soft light to a focal point proximate the soft box, said light control grid comprising:
a first set of strips intersecting a second set of strips forming a generally planar grid having numerous light channels;
said strips configured such that the light channels variably converge and the soft light is directed to the focal point about the width of the grid away from the grid.

6. The light control grid of claim 5 wherein the strips are a flexible fabric material whereby the grid is collapsible.

7. The light control grid of claim 6 further comprising a support member attachable to the grid.

8. The light control grid of claim 5 wherein the first set of strips includes a plurality of first slots which engage a plurality of second slots on the second set of strips.

9. The light control grid of claim 5 wherein the strips are about 2-3 inches wide.

10. The collapsible light control grid of claim 1 wherein the light channels are formed throughout substantially the entire grid.

11. The collapsible light control grid of claim 1 wherein the size of the light channels is substantially uniform throughout the entire grid.

12. The light control grid of claim 5 wherein the light channels are of substantially uniform size and formed throughout substantially the entire grid.

* * * * *